United States Patent
Brimeyer et al.

(10) Patent No.: US 10,517,215 B2
(45) Date of Patent: Dec. 31, 2019

(54) ROLL CENTER FOR ATTACHMENT FRAME CONTROL ARMS

(71) Applicant: Deere & Company, Moline, IL (US)

(72) Inventors: Alex Brimeyer, Bettendorf, IA (US); Joshua R. Pierson, East Moline, IL (US); Bryan R. Yanke, Eldridge, IA (US); Daniel S. Hoffman, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 173 days.

(21) Appl. No.: 15/782,518

(22) Filed: Oct. 12, 2017

(65) Prior Publication Data
US 2019/0110397 A1   Apr. 18, 2019

(51) Int. Cl.
| | | |
|---|---|---|
| *A01D 41/06* | (2006.01) | |
| *A01D 41/16* | (2006.01) | |
| *A01D 57/20* | (2006.01) | |
| *A01D 41/14* | (2006.01) | |

(52) U.S. Cl.
CPC ............ *A01D 41/06* (2013.01); *A01D 41/16* (2013.01); *A01D 57/20* (2013.01); *A01D 41/142* (2013.01)

(58) Field of Classification Search
CPC .... A01D 41/145; A01D 41/141; A01D 41/14; A01D 34/661; A01D 41/16; A01D 67/00; A01D 43/107; A01D 34/283; A01D 41/06; A01D 57/20; A01D 41/142; A01B 63/008; A01B 63/108
See application file for complete search history.

(56) References Cited

U.S. PATENT DOCUMENTS

| 3,574,990 A * | 4/1971 | Calder ................... A01D 41/14 56/208 |
|---|---|---|
| 3,808,781 A * | 5/1974 | Bass ...................... A01D 41/14 493/405 |
| 3,959,957 A * | 6/1976 | Halls ..................... A01D 41/14 56/208 |
| 4,313,294 A * | 2/1982 | Martenas ............. A01D 41/145 56/15.8 |
| 4,724,661 A * | 2/1988 | Blakeslee ........... A01D 43/107 56/15.8 |

(Continued)

FOREIGN PATENT DOCUMENTS

| EP | 3398426 A1 | 11/2018 |
|---|---|---|
| WO | 20020102138 A1 | 12/2002 |

OTHER PUBLICATIONS

European Patent Office Extended Search Report for Application No. 18199251.2 dated Mar. 15, 2019 (6 pages).

*Primary Examiner* — Arpad Fabian-Kovacs
(74) *Attorney, Agent, or Firm* — Michael Best & Friedrich LLP

(57) ABSTRACT

An agricultural harvesting header includes a first frame portion and a second frame portion moveably connected to the first frame portion. An upper control arm is pivotally connected to the first frame portion and pivotally connected to the second frame portion. A lower control arm pivotally connected to the first frame portion and pivotally connected to the second frame portion. The connection between the first frame portion, second frame portion, upper control arm, and a lower control arm forms a roll center positioned at or below ground level.

20 Claims, 6 Drawing Sheets

(56) References Cited

U.S. PATENT DOCUMENTS

| | | | | | |
|---|---|---|---|---|---|
| 4,956,966 | A | * | 9/1990 | Patterson | A01D 41/14 56/181 |
| 4,961,303 | A | * | 10/1990 | McCarty | A01D 43/107 100/169 |
| 5,157,905 | A | * | 10/1992 | Talbot | A01D 41/14 56/15.9 |
| 5,327,709 | A | * | 7/1994 | Webb | A01D 41/14 56/14.4 |
| 5,535,578 | A | * | 7/1996 | Honey | A01D 41/145 56/14.9 |
| 5,633,452 | A | * | 5/1997 | Bebernes | A01D 41/145 56/10.2 E |
| 5,906,089 | A | * | 5/1999 | Guinn | A01D 41/145 56/10.2 E |
| 5,964,077 | A | * | 10/1999 | Guinn | A01D 41/14 56/10.2 E |
| 7,168,226 | B2 | * | 1/2007 | McLean | A01D 41/141 56/10.2 E |
| 7,191,582 | B2 | * | 3/2007 | Bomleny | A01D 41/141 56/10.2 E |
| 7,207,164 | B2 | * | 4/2007 | Bomleny | A01D 41/141 56/10.2 E |
| 7,222,475 | B2 | * | 5/2007 | Bomleny | A01D 41/141 56/10.2 E |
| 7,430,846 | B2 | * | 10/2008 | Bomleny | A01D 41/141 56/10.2 E |
| 7,555,883 | B2 | * | 7/2009 | Fackler | A01D 41/145 56/10.2 E |
| 7,596,935 | B2 | * | 10/2009 | Bollinger | A01D 34/661 56/14.9 |
| 7,603,837 | B2 | * | 10/2009 | Ehrhart | A01D 34/283 56/10.2 E |
| 7,661,251 | B1 | * | 2/2010 | Sloan | A01D 41/141 56/10.2 E |
| 7,726,109 | B2 | * | 6/2010 | Thompson | A01D 34/661 56/15.8 |
| 7,869,922 | B2 | * | 1/2011 | Otto | A01D 41/145 56/10.2 E |
| 7,971,420 | B1 | * | 7/2011 | Bollin | A01D 41/145 56/208 |
| 8,245,489 | B2 | * | 8/2012 | Talbot | A01D 41/141 56/10.2 E |
| 8,261,521 | B2 | * | 9/2012 | Thompson | A01D 34/661 56/15.8 |
| 8,863,483 | B2 | * | 10/2014 | Patterson | A01D 43/04 56/10.2 E |
| 9,668,412 | B2 | | 6/2017 | Ritter et al. | |
| 9,775,291 | B2 | * | 10/2017 | Neudorf | A01D 41/145 |
| 10,257,979 | B2 | * | 4/2019 | Walter | A01B 63/108 |
| 2007/0214760 | A1 | | 9/2007 | Bomleny et al. | |
| 2016/0150716 | A1 | * | 6/2016 | De Coninck | A01B 63/008 56/153 |
| 2017/0086371 | A1 | | 3/2017 | Mossman | |

\* cited by examiner

ROLL CENTER FOR ATTACHMENT FRAME CONTROL ARMS

FIELD

The disclosure relates to harvesting headers for agriculture vehicles, such as combine harvesters.

BACKGROUND

Agricultural vehicles in various forms cut and process crop material. For example, windrowers are dedicated machines for cutting crops from the ground for subsequent baling of the crop material. Combine harvesters combine the three separate operations of crop reaping, threshing, and winnowing into a single machine. Combine harvesters may be configured as multi-crop machines that process different crops by interchanging the header mounted at the front of the machine. For example, a grain header can be attached for harvesting wheat and a corn header can be attached for harvesting corn.

The header may include various cutting implements depending on the type of crop. After being cut, the material is conveyed toward a center of the header, where it is transferred to a feederhouse. The feederhouse includes an elevator for moving the cut material toward a threshing rotor where the material is broken apart. Modern headers, particularly in the case of combine harvesters, can be large and lengthy in order to cut a wide swath through the crop. For example, the long dimension of corn headers for modern combine harvesters may be on the order of ten times the width of the feederhouse to which the headers attach and through which the cut crop material is fed into the machine.

SUMMARY

According to an exemplary embodiment, a harvesting header for an agricultural harvesting machine includes a first frame portion and a second frame portion moveably connected to the first frame portion. An upper control arm is pivotally connected to the first frame portion and pivotally connected to the second frame portion. A lower control arm pivotally connected to the first frame portion and pivotally connected to the second frame portion. The connection between the first frame portion, second frame portion, upper control arm, and a lower control arm forms a roll center positioned at or below ground level.

According to another exemplary embodiment, a harvesting header for an agricultural harvesting machine includes a first frame portion and a second frame portion moveably connected to the first frame portion. An upper control arm is connected to the first frame portion at a first contact point and connected to the second frame portion at a second contact point. A lower control arm is connected to the first frame portion at a third contact point and connected to the second frame portion at a fourth contact point. An upper control arm axis is defined by a line passing through a planar representation of the first contact point and the second contact point. A lower control arm axis is defined by a line passing through a planar representation of the third contact point and the fourth contact point. A roll center is positioned at an intersection between the upper control arm axis and the lower control arm axis. The roll center is positioned at or below ground level.

According to another exemplary embodiment, an agricultural harvesting machine includes a chassis and ground engaging members for moving the chassis. A feederhouse is connected to the chassis for receiving agricultural material. A harvesting header cuts and gathers agricultural material and delivers it to the feederhouse. The harvesting header includes a first frame portion and a second frame portion moveably connected to the first frame portion. An upper control arm is pivotally connected to the first frame portion and pivotally connected to the second frame portion. A lower control arm pivotally connected to the first frame portion and pivotally connected to the second frame portion. The connection between the first frame portion, second frame portion, upper control arm, and a lower control arm forms a roll center positioned at or below ground level.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

The terms "side-to-side," "sideways," "laterally," or "lateral" refer to a direction that is horizontal and generally parallel to the longitudinal extent of the agricultural harvesting head itself. This direction is perpendicular to a direction of travel "V" of the machine as it travels through the field harvesting crops. The terms "in front of," "front," "forward," "fore," and the like refer to the direction of travel "V." The terms "back," "rear," "behind," "to the rear of," and the like refer to a direction opposite to the direction of travel "V."

Figure 1:
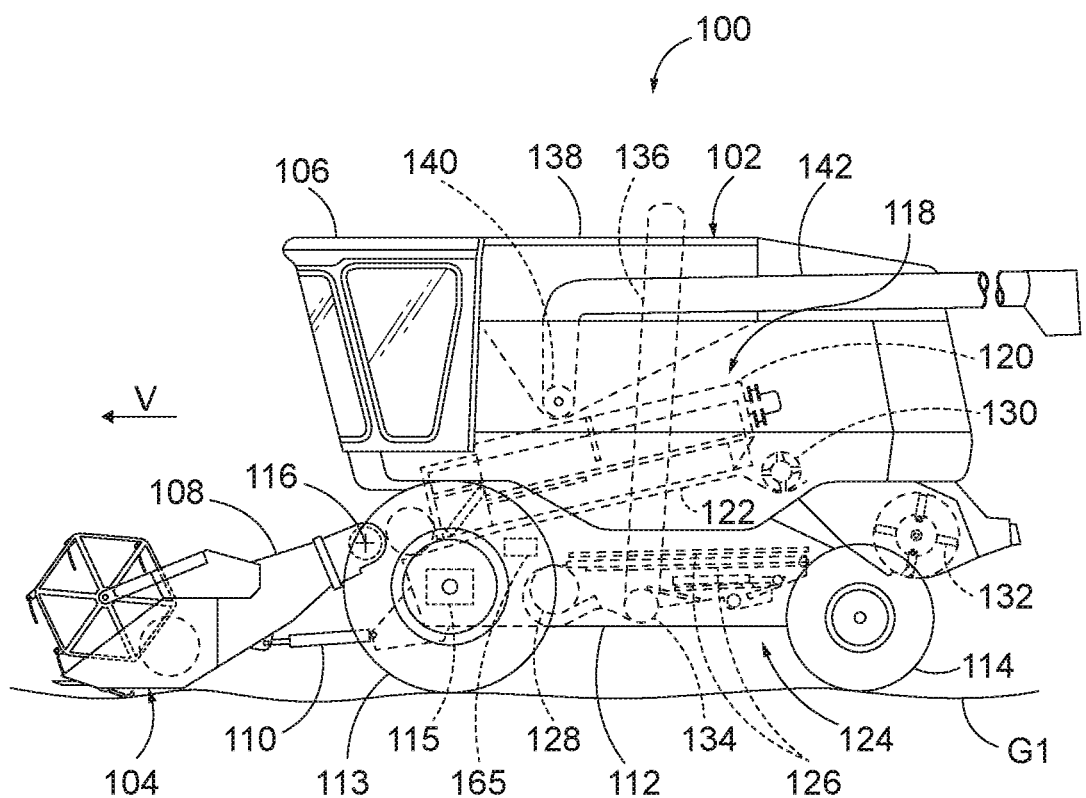
FIG. 1 is a side view of an agricultural vehicle.

FIG. 1 illustrates an agricultural vehicle 100 including a combine harvester 102 and an agricultural harvesting head 104 supported on the front of the vehicle 100. The combine harvester 102 includes an operator cabin 106 that contains controls for piloting and operating the combine harvester. A feederhouse 108 is pivotally coupled to the front of the combine harvester 102. One or more actuators no are coupled to and between the feederhouse 108 and a chassis 112 of the combine harvester 102 to support the forward end of the feederhouse 108 and the agricultural harvesting head 104 above the ground. The chassis 112 is supported on wheels 114 that are driven by hydraulic motors 115 for travel over the ground level G1.

The actuators 110 are double-acting hydraulic cylinders capable of moving from an extended position to a retracted position. When the actuators 110 are extended, the forward end of the feederhouse 108 and the agricultural harvesting head 104 are raised upward, pivoting clockwise (in FIG. 1) about a pivot joint 116 that couples the feederhouse 108 to the chassis 112. When the actuators 110 are retracted, the forward end of the feederhouse 108 and the agricultural harvesting head 104 are lowered, pivoting counterclockwise (in FIG. 1) about the pivot joint 116.

Thus, by extending and retracting the actuators 110, the height of the feederhouse 108 and the agricultural harvesting head 104 can be varied. Furthermore, changing the hydraulic fluid pressure in the actuators 110 will change the amount of downforce exerted by the agricultural harvesting head 104 against the ground. As the hydraulic fluid pressure in the actuators no increases, the downforce applied by the agricultural harvesting head 104 to the ground will decrease. As the hydraulic fluid pressure in the actuators no decreases, the downforce due to the weight of the agricultural harvesting head 104 will increase. In an alternative arrangement, the actuators no can be electric or pneumatic devices such as linear or rotary motors.

The combine harvester 102 receives crop cut by the agricultural harvesting head 104 and conveys it into a threshing system 118. The threshing system 118 includes a rotor 120 that rotates against a concave 122 to separate grain from at least a portion of the "material other than grain" (MOG). The grain falls downward into a cleaning system 124. The cleaning system 124 includes at least one sieve or chaffer 126. Because the grain in the cleaning system can include some light MOG, the cleaning system 124 also includes a fan 128 that blows air through the sieve or chaffer 126. This airflow levitates light MOG and carries it rearward where it is deposited on the ground.

A re-thresher 130 is provided at the rear of the threshing system 118 to receive the MOG separated from the grain. Grain remaining within the MOG is further separated from the MOG in the re-thresher 130 and drops into the cleaning system 124. The MOG leaves the threshing system 118 and is conveyed backward into a chopper 132, which throws the MOG onto the ground behind the vehicle 100.

The grain that is cleaned in the cleaning system 124 is carried to an auger 134 that carries the clean grain to one side of the combine harvester 102. An elevator 136 receives the clean grain from the auger 134 and lifts the clean grain upward depositing it into a grain tank 138.

Periodically, an unloading vehicle such as a grain truck or grain cart will travel alongside the vehicle 100 and an auger 140 in the grain tank will unload the grain tank 138 through an elongate outlet 142. The elongate outlet 142 is pivoted outward from the vehicle 100 to extend over the grain truck or grain cart which receives the clean grain and carries it away for storage.

Figure 2:
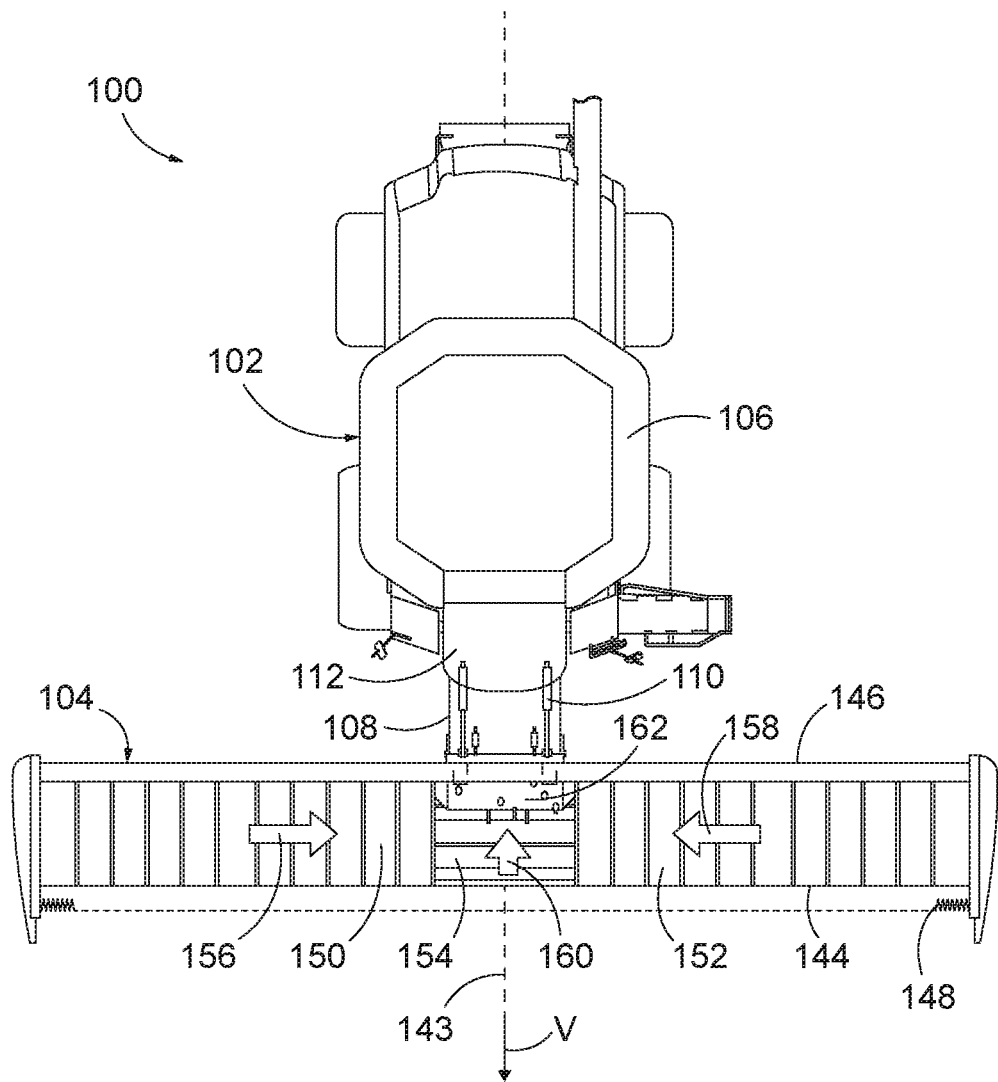
FIG. 2 is a top view of the agricultural vehicle of FIG. 1.

As shown in FIG. 2, the harvesting head 104 is supported on an end of the feederhouse 108 and extends transversely to direction of travel V and to a central axis 143 of the harvester vehicle 102. The harvesting head 104 can also have a center axis that is aligned with the central axis 143 of the harvester vehicle 102. In the illustrated embodiment, the harvesting head 104 is wider than the chassis 112. The harvesting head 104 includes a forward edge 144, a rear edge 146, and a cutting bar 148 coupled to the forward edge 144. The cutting bar 148 extends substantially along the width of the header harvesting head 104 and cuts or separates crop plants (not shown) from the ground G1 as the harvester vehicle 102 moves along the ground G1.

The harvesting head 104 supports a first or right side conveyor 150, a second or left side conveyor 152, and an intermediate or center conveyor 154 positioned between the right side conveyor 150 and the left side conveyor 152. In the illustrated embodiment, the center conveyor 154 is aligned with the chassis 112 centerline and, and each of the conveyors 150, 152, 154 are formed as endless belt conveyors. As the cutting bar 148 severs crops from the ground G, the cut material falls onto the conveyors 150, 152, 154. The right side conveyor 150 moves cut material in a first direction 156 toward the center conveyor 154, and the left side conveyor 152 moves cut material in a second direction 158 toward the center conveyor 154. The center conveyor 154 moves the cut material in a third direction 160 past a feed drum 162 and toward the feederhouse 108.

Figure 3:
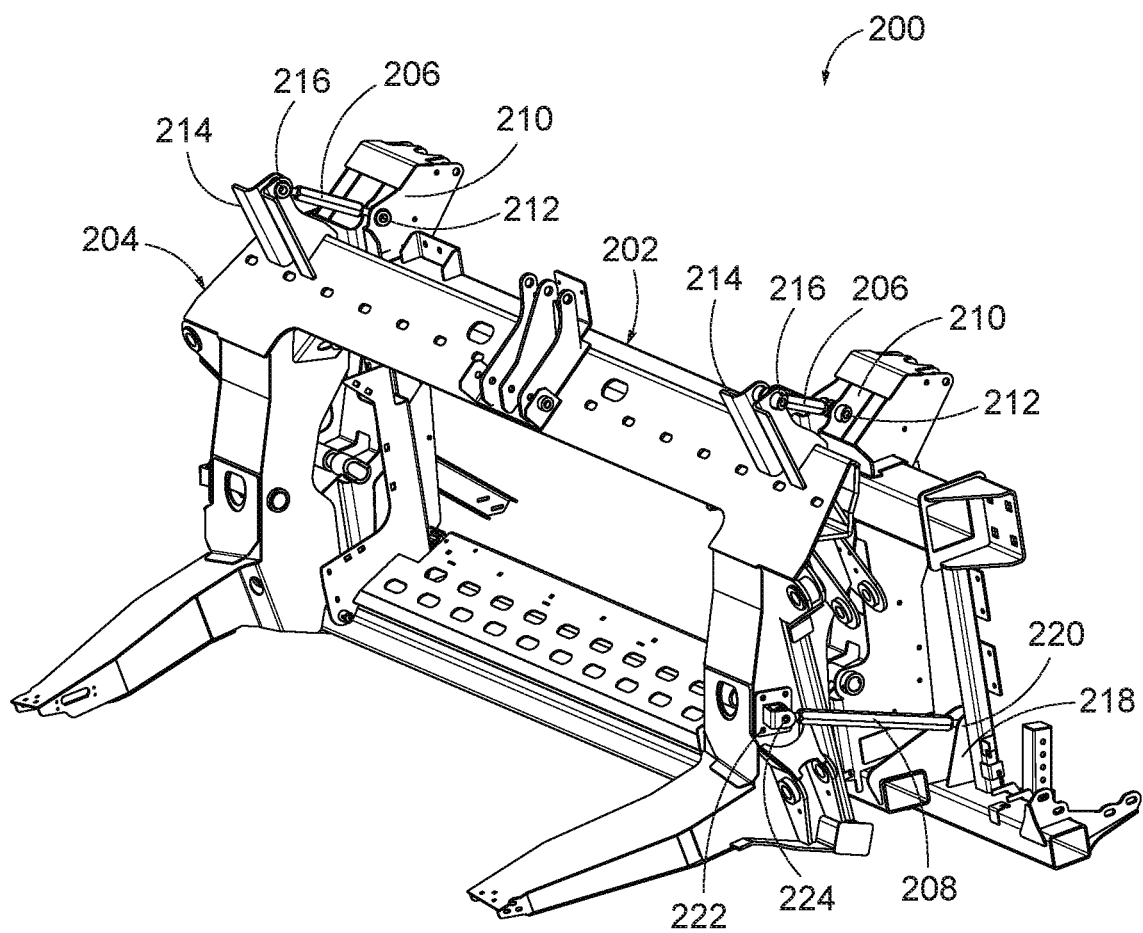
FIG. 3 is a front perspective view of a header frame section.
Figure 4:
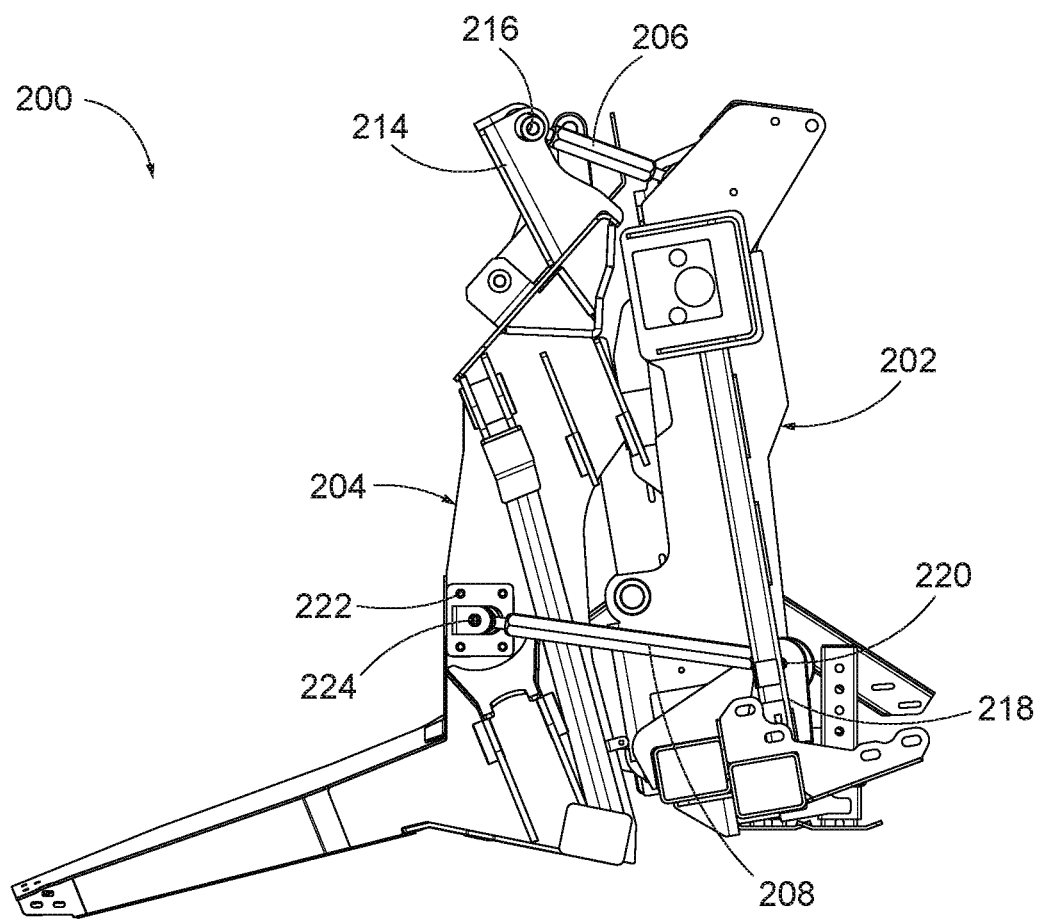
FIG. 4 is a side view of the header frame section of FIG. 3.

FIGS. 3 and 4 show an exemplary embodiment of a header frame section 200 having first and second frame portions, for example an attachment frame 202 and a main frame 204. The attachment frame 202 connects to the feederhouse 108, and the main frame 204 supports the other components of the harvesting head 104, for example the cutter bar 148 and conveyors 150, 152, 154 shown in FIG. 2.

The main frame 204 is pivotally connected to the attachment frame 202 by a pair of upper control arms 206 and a pair of lower control arms 208. The upper control arms 206 are pivotally connected to a first bracket 210 on the attachment frame 202 at a first connection point 212 and pivotally connected to a second bracket 214 on the main frame 204 at a second connection point 216. The lower control arms 208 are pivotally connected to a third bracket 218 on the attachment frame 202 at a third connection point 220 and pivotally connected a fourth bracket 222 on the main frame 204 at a fourth connection point 224. The upper and lower control arms 206, 208 allow for height adjustment of the main frame 204 as it traverses uneven ground.

In an exemplary embodiment the control arms 206, 208 extend along an axial direction that is non-parallel to the chassis axis 143. The upper control arms 206 are angled so that they diverge from the chassis axis 143 in the direction of travel V, with the first connection point 212 positioned closer to the chassis axis 143 than the second connection point 216. The lower control arms 208 are angled so that they converge toward the chassis axis 143 in the direction of travel V, with the third connection point 220 positioned further from the chassis axis 143 than the fourth connection point 224. In other embodiments, the control arms 206, 208 can extend along an axis in a common plane which may or may not be parallel to the plane of the chassis axis 143.

Figure 5:
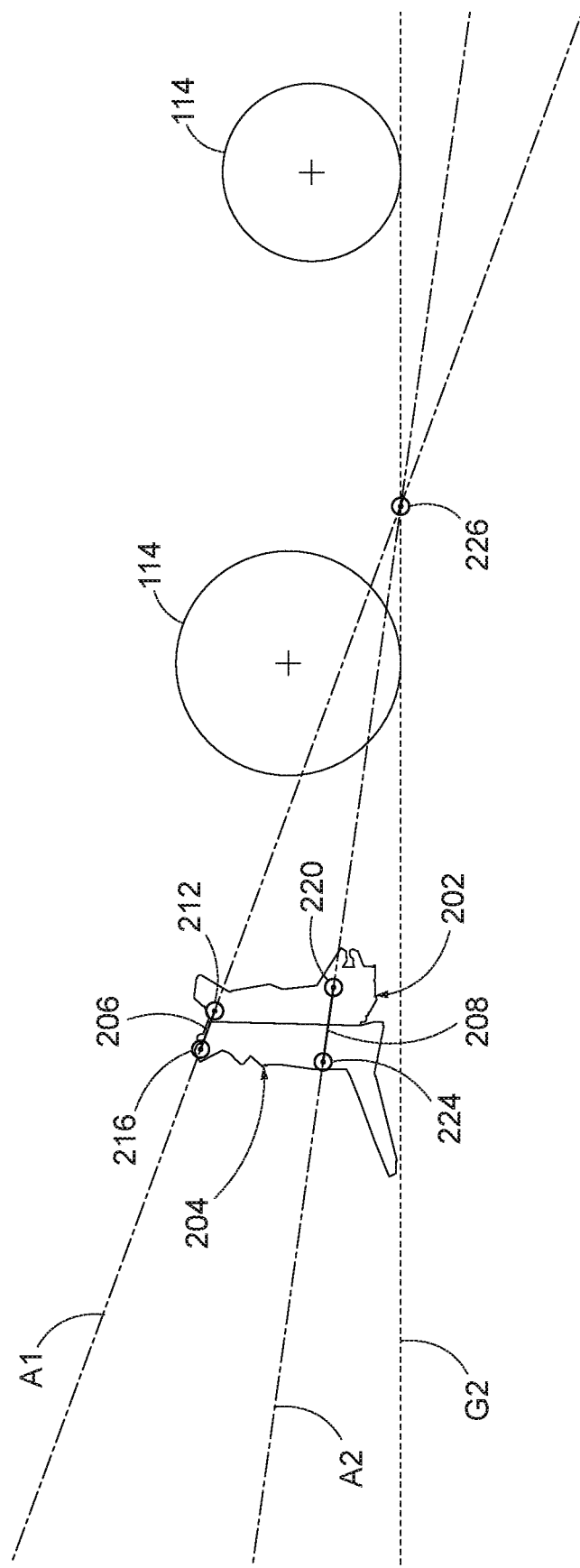
FIG. 5 is a schematic view depicting a first exemplary roll center of the frame section of FIG. 3 positioned at ground level.
Figure 6:
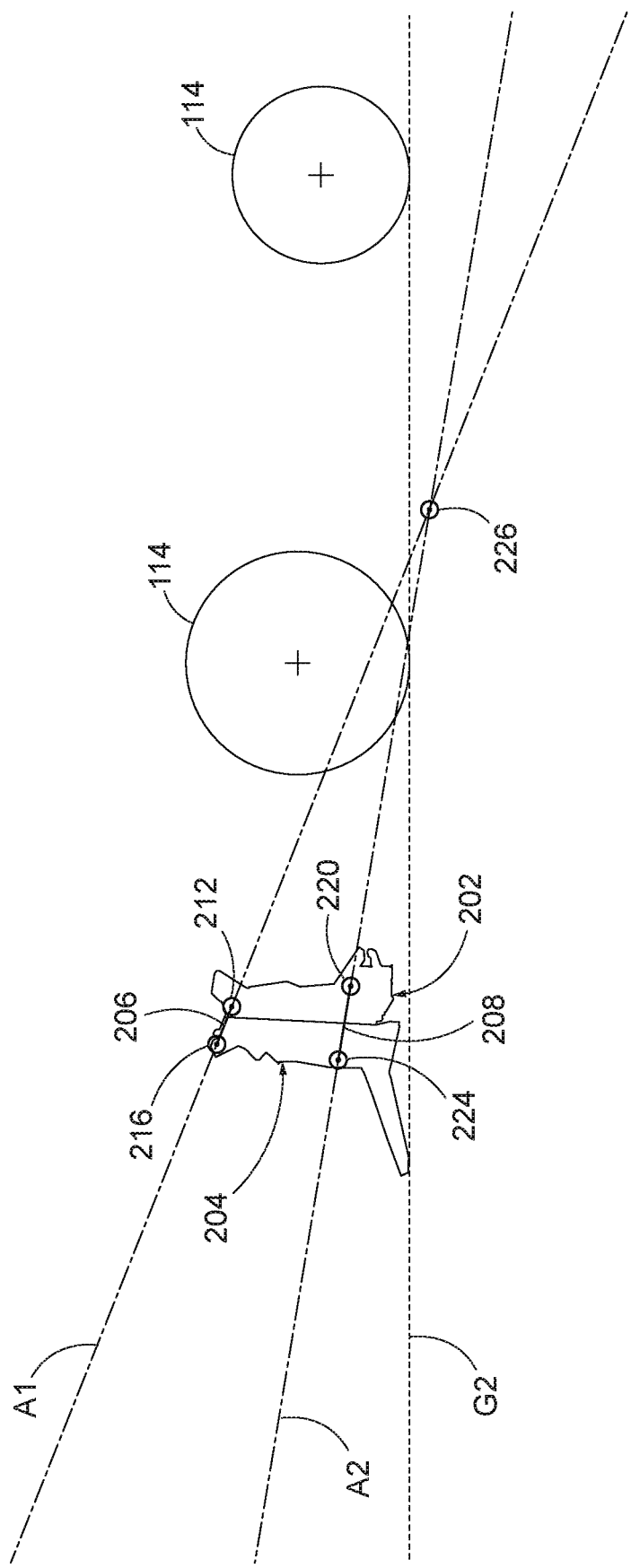
FIG. 6 is a schematic view depicting a second exemplary roll center of the frame section of FIG. 3 positioned below ground level.

FIGS. 5 and 6 show a simplified, two-dimensional representation of the attachment frame 202, the main frame 204, the upper control arms 206, the lower control arms 208 and the first through fourth connection points 212, 216, 220, 224 that define a roll center 226 for the attachment frame. FIG. 5 shows a first roll center 226 positioned at ground level G2 and FIG. 6 shows a second roll center 226 positioned below ground level G2. In this schematic view the attachment frame 202, the main frame 204, the upper control arms 206, and the lower control arms 208 form a four-bar linkage with the intersection of the control arms 206, 208 defining the roll center 226.

In the illustrated embodiments, the roll center 226 is defined at the intersection between an upper control arm axis A1 and a lower control arm axis A2. As discussed above, the control arms 206, 208 can extend non-parallel to the chassis axis 143 and in different planes. Accordingly, the roll center 226 is determined by a planar or two-dimensional representation of the upper and lower control arm axes A1, A2. The upper control arm axis A1 is defined by the axis that extends through the first and second connection points 212, 216 viewed in a single plane. The lower control arm axis A2 is defined by the axis that extend through the third and fourth connection points 220, 224 viewed in a single plane. FIG. 5 shows an embodiment in which the upper control arm axis A1 and the lower control arm axis A2 intersect at ground level G2, therefore creating a roll center 226 at ground level G2. FIG. 6 shows an embodiment in which the upper control arm axis A1 and the lower control arm axis A2 intersect below ground level G2, therefore creating a roll center 226 below ground level G2. Because the ground level position is not typically flat (as shown in FIG. 1), the term ground level can mean ground level in the ordinary use of the term and also as a plane defined by the lower points of the front and back wheels 114, or other ground engaging members such as treads. As shown in FIGS. 5 and 6, both roll centers 126 are positioned below the harvester 102 and also between the wheels 114.

As mentioned, when the vehicle 100 is traveling, the height of the ground can vary. Abrupt changes in height can cause engagement of the harvesting head 104 with the ground. Striking the ground creates a draft force that can increase the downward load on the main frame 204 and dislodges the proper position of the cutter bar 148, causing it to dig into the ground instead of cutting material just about ground level. When this happens repeatedly, the cutter bar 148 can become clogged with debris, and an operator will have to stop the operation of the agricultural vehicle 100 to clear the debris. By positioning the roll center at or below ground level, the draft forces acting on the harvester head 104 will act to lift the cutter bar 148, helping it to ride up and over crop material more easily, rather than pushing material in front of the cutter bar 148.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A harvesting header for an agricultural harvesting machine, the header comprising:
   a first frame portion;
   a second frame portion moveably connected to the first frame portion;
   an upper control arm pivotally connected to the first frame portion and pivotally connected to the second frame portion; and
   a lower control arm pivotally connected to the first frame portion and pivotally connected to the second frame portion,
   wherein, when the harvesting header is attached to a harvesting machine, the connection between the first frame portion, second frame portion, upper control arm, and lower control arm creates a roll center of the second frame portion positioned at or below ground level over which the machine is configured to travel and behind the second frame portion relative to a direction of travel.

2. The harvesting header of claim 1, wherein the upper control arm is connected to the first frame portion at a first contact point and connected to the second frame portion at a second contact point, and the lower control arm is connected to the first frame portion at a third contact point and connected to the second frame portion at a fourth contact point.

3. The harvesting header of claim 2, wherein an upper control arm axis is defined by a line passing through a first planar representation of the first contact point and the second contact point and a lower control arm axis is defined by a line passing through a second planar representation of the third contact point and the fourth contact point, and wherein the roll center is positioned at an intersection between the upper control arm axis and the lower control arm axis, and wherein the first planar representation and the second planar representation are coincident planes orthogonal to the ground level and extending along the chassis axis.

4. The harvesting header of claim 2, wherein the first contact point is positioned closer to a central axis than the second contact point and wherein the fourth contact point is positioned closer to the central axis than third contact point.

5. The harvesting header of claim 1, wherein the first frame portion is configured to connect to an agricultural harvesting vehicle.

6. The harvesting header of claim 1, wherein the roll center is positioned below ground level.

7. The harvesting header of claim 1, wherein the second frame portion supports a cutter bar.

8. The harvesting header of claim 7, wherein the second frame portion supports a conveyor.

9. A harvesting header for an agricultural harvesting machine, the header comprising:
   a first frame portion;
   a second frame portion moveably connected to the first frame portion;
   an upper control arm connected to the first frame portion at a first contact point and connected to the second frame portion at a second contact point; and
   a lower control arm connected to the first frame portion at a third contact point and connected to the second frame portion at a fourth contact point,
   wherein, when the harvesting header is attached to a harvesting machine, an upper control arm axis is defined by a line passing through a first planar representation of the first contact point and the second contact point and a lower control arm axis is defined by a line passing through a second planar representation of the third contact point and the fourth contact point, and wherein a roll center is defined by the intersection between the upper control arm axis and the lower control arm axis, and wherein the roll center is positioned at or below ground level over which the machine is configured to travel and positioned behind the second frame portion relative to a direction of travel, and wherein the first planar representation and the second planar representation are coincident planes orthogonal to the ground level and extending along the chassis axis.

10. The harvesting header of claim 9, wherein the first contact point is positioned closer to a central axis than the second contact point and wherein the fourth contact point is positioned loser to the central axis than third contact point.

11. The harvesting header of claim 9, wherein the first frame portion is configured to connect to an agricultural harvesting vehicle.

12. The harvesting header of claim 9, wherein the roll center is located below ground level.

13. The harvesting header of claim 9, wherein the second frame portion supports a cutter bar.

14. The harvesting header of claim 9, wherein the upper control arm and the lower control arm are pivotally connected to the first frame portion and pivotally connected to the second frame portion.

15. An agricultural harvesting machine comprising:
a chassis;
ground engaging members for moving the chassis;
a feederhouse connected to the chassis for receiving agricultural material;
a harvesting header for cutting and gathering agricultural material and delivering it to the feederhouse, the harvesting header including;
a first frame portion;
a second frame portion moveably connected to the first frame portion;
an upper control arm pivotally connected to the first frame portion and pivotally connected to the second frame portion; and
a lower control arm pivotally connected to the first frame portion and pivotally connected to the second frame portion,
wherein, when the harvesting header is attached to a harvesting machine, the connection between the first frame portion, second frame portion, upper control arm, and a lower control arm forms a roll center positioned at or below ground level over which the machine is configured to travel and behind the second frame portion relative to a direction of travel.

16. The agricultural harvesting machine of claim 15, wherein the upper control arm is connected to the first frame portion at a first contact point and connected to the second frame portion at a second contact point, and the lower control arm is connected to the first frame portion at a third contact point and connected to the second frame portion at a fourth contact point.

17. The agricultural harvesting machine of claim 16, wherein an upper control arm axis is defined by a line passing through a first planar representation of the first contact point and the second contact point and a lower control arm axis is defined by a line passing through a second planar representation of the third contact point and the fourth contact point, and wherein the roll center is positioned at an intersection between the upper control arm axis and the lower control arm axis, and wherein the first planar representation and the second planar representation are coincident planes orthogonal to the ground level and extending along the chassis axis.

18. The agricultural harvesting machine of claim 15, wherein the roll center is positioned below ground level.

19. The agricultural harvesting machine of claim 15, wherein the roll center is positioned beneath the chassis.

20. The agricultural harvesting machine of claim 15, wherein the harvesting head includes a cutter bar and a conveyor.

* * * * *